US008199677B1

(12) United States Patent
Amis et al.

(10) Patent No.: US 8,199,677 B1
(45) Date of Patent: Jun. 12, 2012

(54) DISTANCE VECTOR ROUTING VIA MULTI-POINT RELAYS

(75) Inventors: Alan D. Amis, Plano, TX (US); James A. Stevens, Lucas, TX (US); Charles D. Young, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1626 days.

(21) Appl. No.: 11/302,865

(22) Filed: Dec. 14, 2005

(51) Int. Cl.
*H04L 12/28* (2006.01)
*H04B 7/14* (2006.01)
*H04J 3/08* (2006.01)

(52) U.S. Cl. ......... 370/255; 370/315; 370/338; 370/389
(58) Field of Classification Search .................. 370/254
See application file for complete search history.

(56) References Cited

U.S. PATENT DOCUMENTS

| | | | | |
|---|---|---|---|---|
| 5,412,654 | A * | 5/1995 | Perkins ........................ | 370/312 |
| 6,483,852 | B1 * | 11/2002 | Jacquet et al. ............... | 370/466 |
| 6,728,214 | B1 * | 4/2004 | Hao et al. ..................... | 370/241 |
| 2002/0133534 | A1 * | 9/2002 | Forslow ........................ | 709/200 |
| 2003/0179718 | A1 * | 9/2003 | Ebata et al. ................... | 370/255 |
| 2004/0143842 | A1 * | 7/2004 | Joshi ............................ | 725/32 |
| 2005/0037789 | A1 * | 2/2005 | Rhee et al. .................... | 455/507 |
| 2005/0041627 | A1 * | 2/2005 | Duggi ........................... | 370/338 |
| 2006/0007865 | A1 * | 1/2006 | White et al. ................... | 370/238 |
| 2006/0250999 | A1 * | 11/2006 | Zeng et al. .................... | 370/312 |
| 2007/0025274 | A1 * | 2/2007 | Rahman et al. ............... | 370/254 |
| 2007/0127421 | A1 * | 6/2007 | D'Amico et al. ............. | 370/338 |
| 2007/0263628 | A1 * | 11/2007 | Axelsson et al. ............. | 370/392 |

OTHER PUBLICATIONS

Joint Tactical Radio System Programmable, Modular Communications System, Dec. 10, 2004, GlobalSecurity.org, available online at http://web.archive.org/web/20041210125546/http://www.globalsecurity.org/military/systems/ground/jtrs.htm.*
Waitzman et al, RFC 1075: Distance Vector Multicast Routing Protocol, Nov. 1988, Internet Engineering Task Force.*
Perkins et al, Ad Hoc on Demand Distance Vector (AODV) Routing, Nov. 20, 1998, Internet Engineering Task Force, available online at http://www.ietf.org/proceedings/99mar/I-D/draft-ietf-manet-aodv-02.txt.*

* cited by examiner

*Primary Examiner* — Andrew Chriss
(74) *Attorney, Agent, or Firm* — Donna P. Suchy; Daniel M. Barbieri

(57) ABSTRACT

The present invention is a method and system for propagating routing information in a wireless network. In an exemplary embodiment, the method includes defining a set of artery nodes to propagate distance vector routing information throughout the wireless network. The set of artery nodes may broadcast distance vector routing information to neighboring network nodes. The method may also include receiving distance vector routing information by the neighboring nodes to modify distance vector routing tables defined within each of the neighboring nodes. The set of artery nodes may then re-broadcast distance vector routing information in order to propagate distance vector routing information throughout the wireless network.

13 Claims, 3 Drawing Sheets

| Node 12 Routing Table |||
|---|---|---|
| Destination | Next Hop | Number Hops |
| 41 | 41 | 1 |
| 21 | 21 | 1 |
| All others | 21 | Varies |

| Node 21 Routing Table |||
|---|---|---|
| Destination | Next Hop | Number Hops |
| 31 | 31 | 1 |
| 12 | 12 | 1 |
| 5 | 5 | 1 |
| All others | 31 | Varies |

DISTANCE VECTOR ROUTING VIA MULTI-POINT RELAYS

CROSS REFERENCE TO RELATED APPLICATIONS

The present application is related to U.S. patent application Ser. No. 10/867,481 filed Jun. 14, 2004 which issued on Jul. 8, 2008 as U.S. Pat. No. 7,397,810, B1 which is herein incorporated by reference in its entirety.

FIELD OF THE INVENTION

The present invention relates generally to the field of wireless communication networks and more particularly to a method and a system for distance vector routing via multi-point relays.

BACKGROUND OF THE INVENTION

Topology control is an important factor in the management/maintenance of mobile ad hoc networks (MANETs), where the underlying communication link topology may constantly change. A first requirement is finding a minimum connected subgraph of the network node topology to serve as a backbone for routing information. Various techniques have been proposed to propagate such routing topology information through a network. For instance, several routing protocols use multi-point relays (MPRs) to strategically propagate routing information in a controlled manner.

MPRs may be strategically selected to minimize the overhead of network node routing information while still covering the entire network. Network nodes that are not MPRs (i.e., ordinary nodes) transmit their routing information to all one hop neighbors only. MPR nodes then retransmit routing information heard by all one hop neighbors, thereby propagating the routing information to all MPR nodes throughout the connected network in time. The most notable protocol that employs MPRs is the Optimized Link State Routing (OLSR) protocol. The OLSR protocol may be implemented in MANETs.

Although MPRs may be utilized to propagate routing information, such relays are associated with a number of limitations. First, conventional MPRs used in routing protocols transmit link state information only. While link state information provides full topology of the network, it demands a large overhead in message complexity, which is directly proportional to the number of nodes and links in the network. Additionally, in dynamic mobile networks (e.g., MANETs), link state information may change before it can be propagated to all MPRs.

A further limitation associated with conventional use of MPRs is the election of MPRs using clustering techniques or algorithms whereby an elected MPR has an associated node group membership. With such techniques, if the MPR disappears from or loses connectivity with its group nodes, the associated nodes are left with no routing information until another MPR and group membership are formed. Therefore, such a configuration ties an entire group of nodes to an individual MPR, which may cause thrashing problems if the MPR disappears or loses connectivity from its node group members.

Therefore, it would be desirable to provide a method for propagating network node routing information that requires a limited amount of overhead and allows routing table updates to occur independent of node group membership.

SUMMARY OF THE INVENTION

In accordance with a first aspect of the present invention, a method for propagating network node routing information in a wireless network is provided. In such aspect, the method may include electing a set of artery nodes to propagate distance vector routing information throughout the wireless network. The elected set of artery nodes may function as MPRs to transmit distance vector routing information to neighboring network nodes. The method may also include receiving distance vector routing information by the neighboring nodes in order to modify distance vector routing tables stored by each of the neighboring nodes. The set of artery nodes may then retransmit distance vector routing information in order to propagate distance vector routing information throughout the wireless network.

In accordance with specific aspects of the disclosed method, the set of artery nodes function as MPRs; however, they may be elected using the Artery node election algorithm described in U.S. Pat. No. 7,397,810 B1 issued Jul. 8, 2008 rather than by a clustering algorithm or such methods as used in the OLSR protocol. In addition, the neighboring nodes may include artery and non-artery nodes. Regardless, each non-artery node is one hop from an artery node. It is contemplated that the present method may be performed by computer-executable instructions included within a computer-readable medium. It is further contemplated that the present method may be implemented in a variety of wireless data networks, particularly MANETs. For example, such a MANET as may be included in a joint tactical radio system (JTRS), such as a Cluster 1 JTRS, a Cluster 5 JTRS, or an airborne maritime and fixed-station (AMF) JTRS.

In accordance with an additional aspect of the present invention, a system for propagating routing information in a wireless network is provided. The system may include at least one artery node to propagate distance vector or link state routing information throughout the wireless network. Furthermore, a plurality of non-artery nodes may be communicatively coupled to the at least one artery node in which each non-artery node is located one hop from the at least one artery node. In such system, the at least one artery node and plurality of non-artery nodes broadcast routing information to each 1 hop neighboring node to modify a routing table defined within each 1 hop neighboring node. In turn, the at least one artery node re-broadcasts routing information heard by all one hop neighboring nodes to allow routing information to be propagated throughout the wireless network.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
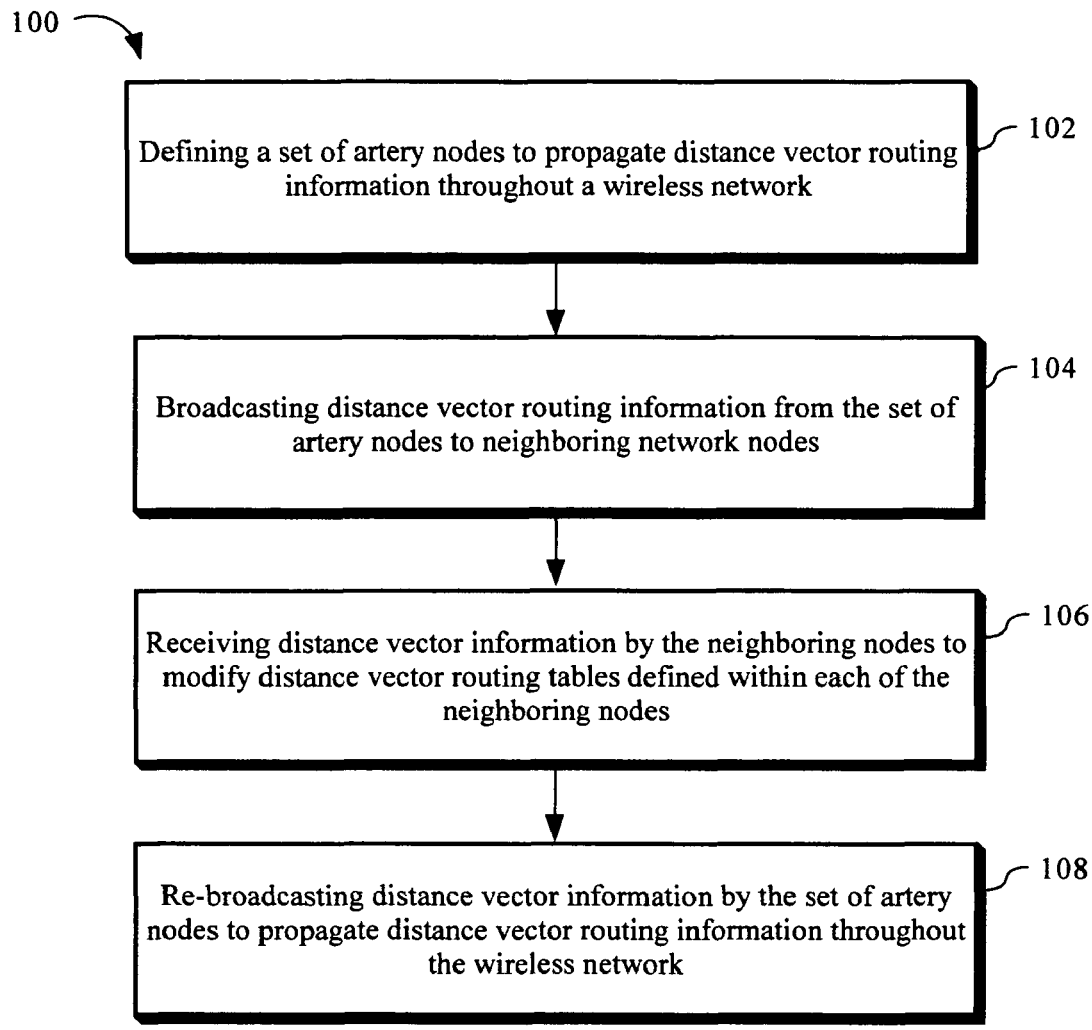
FIG. 1 is flow diagram of a method for propagating routing information in a wireless network in accordance with an exemplary embodiment of the present invention.

Referring to FIG. 1, a method 100 for propagating routing information in a wireless network is provided. In an exemplary embodiment, the method 100 may include defining a set of artery nodes to propagate distance vector routing information throughout the wireless network 102. In an exemplary embodiment, an artery node may be defined by the following node classification rule. A node x is said to be an artery node if it has two neighbors y and z such that y and z are not neighbors of each other and x is the only common neighbor for both y and z. In other words, node x is the mid-point of the shortest path between y and z. Thus, an artery node provides the shortest path between every node in a given topology of a communication network.

In the present embodiment, an artery node is used as a multi-point relay (MPR) node to propagate routing information. For example, an artery node is elected by an artery node election algorithm, which is a distributed algorithm as described in U.S. Pat. No. 7,397,810 B1 issued Jul. 8, 2008. By employing a distance vector routing protocol with the artery node, the artery node of the present invention is not dependent upon association or clustering with other nodes as with prior art MPR nodes. Further, the artery node operates as an arbiter of bandwidth to its one hop non-artery node neighbors and forms an infrastructure to propagate data throughout the network.

As illustrated in FIG. 1, the method 100 may include the broadcasting of distance vector routing information by the set of artery nodes to neighboring network nodes 104. In an exemplary embodiment, the neighboring nodes include artery and non-artery nodes. However, in such embodiment, each non-artery node is one hop from an artery node. In an exemplary embodiment, a non-artery node may be defined by the following node classification rule. Node x is said to be a non-artery node if, for each pair of neighboring nodes y and z of node x, nodes y and z are either (1) neighbors of each other (directly connected) or (2) y and z are connected by a 2-hop path going through an artery node.

The method 100 may also include receiving distance vector routing information by the neighboring nodes and subsequently modifying distance vector routing tables stored within each of the neighboring nodes 106. The set of artery nodes may then retransmit distance vector routing information in order to propagate distance vector routing information throughout the wireless network 108. In an embodiment, non-artery nodes transmit their routing information to all one hop neighbors and, in turn, all one hop neighbors update their distance vector routing table. In addition, artery nodes will retransmit routing information heard by all one hop neighbors, thereby propagating the routing information to all artery nodes throughout the connected network in time.

Figures 2, 3:
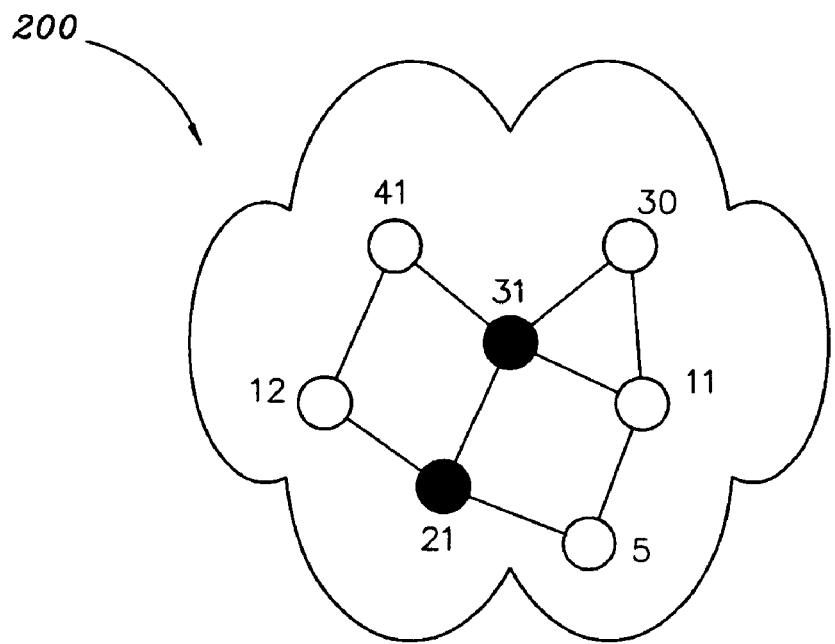
FIG. 2 is a schematic diagram illustrating an exemplary wireless network in accordance with an exemplary embodiment of the present invention, wherein the wireless network employs artery nodes to propagate distance vector routing information.
FIG. 3 is a tabular diagram of exemplary routing table information.

Referring to FIG. 2, a system 200 for propagating routing information in a wireless network is provided. In a preferred embodiment, the system 200 involves a distance vector routing protocol that overlays an artery node protocol. The use of a distance vector routing protocol executed by the artery nodes achieves lower messaging overhead while providing all necessary routes. That is, a node has routes to all of its one hop neighbor nodes and neighbor nodes that are more than one hop away are routed via an artery node. Moreover, as network node topology changes occur, the updated distance vector routing data need only propagate to artery nodes where inconsistencies exist.

As illustrated in FIG. 2, the system 200 may include at least one artery node to propagate distance vector routing information throughout the wireless network. As illustrated in FIG. 2, nodes 21 and 31 are artery nodes. In an exemplary embodiment, an artery node functions as an MPR. In such embodiment, an artery node is elected by an artery node election algorithm described in U.S. Pat. No. 7,397,810 B1 issued Jul. 8, 2008 rather than a clustering algorithm or such methods as used in the OLSR protocol. Furthermore, the system 200 includes a plurality of non-artery nodes which are communicatively coupled to the at least one artery node. As illustrated in FIG. 2, nodes 5, 11, 12, 30, and 41 are non-artery nodes, each of which is located one hop from an artery node. In such system 200, each node exchanges distance vector information with each one hop neighboring node to modify a routing table stored within each one hop neighboring node. In turn, the at least one artery node then retransmits routing information heard by all one hop neighboring nodes to allow routing information to be propagated throughout the wireless network. Thus, while non-artery nodes may update their distance vector routing tables, they may not be required to retransmit them.

Referring to FIG. 3, exemplary information included within a node distance vector routing table is provided. For example, a routing table defined within node 12 (a non-artery node) indicates that nodes 41 and 21 are one hop from node 12. Moreover, a routing table defined within node 21 (an artery node) indicates that nodes 31, 12, and 5 are one hop away.

Figure 4:
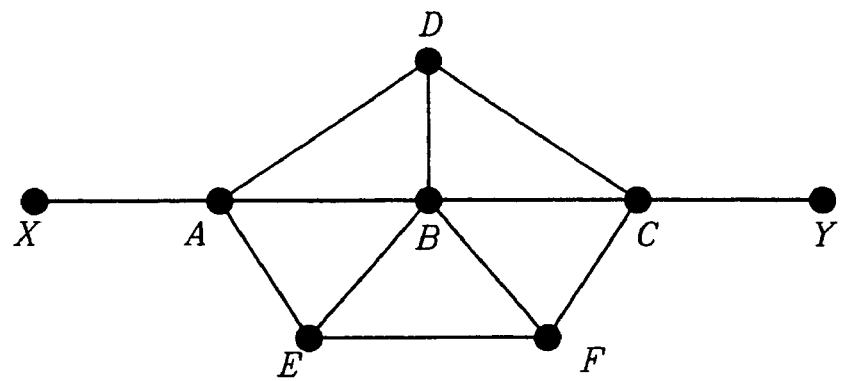
FIG. 4 is a schematic diagram demonstrating an exemplary wireless network in accordance with the present invention, wherein neighboring nodes that are more than one hop away from each other are connected via an artery node.

Referring to FIG. 4, an illustration of a lemma that any two hop node pair in an artery network will share a common one hop artery node is provided. To demonstrate that any two hop node pair in an artery network will share a common one hop artery node, proof by contradiction may be utilized. As such, an initial assumption that there exists a two hop node pair that does not share a common one hop artery node neighbor is made. According to the assumption, a pair of two hop neighbors, for example A and C, is connected by a non-artery node. As illustrated in FIG. 4, although other connections between nodes A and C exist, none are a common one hop artery node neighbor of nodes A and C. Since there is no artery node connecting A and C, their artery node neighbors must be disjointed, meaning that node B must become an artery node, which contradicts the assumption. Therefore, the assumption is false and any pair of two hop neighbors will share a common one hop artery node.

Figure 5:
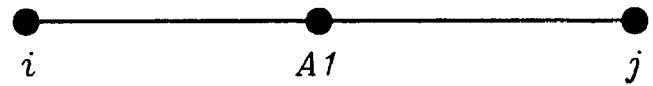
FIG. 5 is a schematic diagram of two nodes connected via an artery node in accordance with an exemplary embodiment of the present invention.
Figure 6:
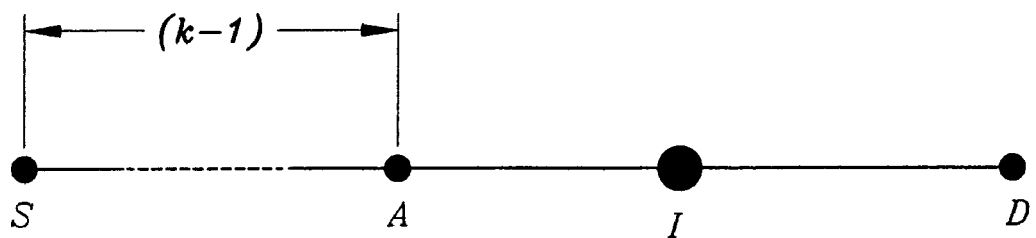
FIG. 6 is a schematic diagram demonstrating that the shortest path between two nodes in an artery network is along a contiguous path of artery nodes.

Referring to FIGS. 5 and 6, a theorem that the shortest path between two non-artery nodes is through a contiguous artery node neighbor is demonstrated. In the present theorem, $SP_{D(k)}$ is defined as the shortest path to destination D of k hops from some source node S. $SP_{A(k-1)}$ is defined as the shortest path to artery node A of (k−1) hops from some source node S, wherein the path consists of only artery nodes. A hypothesis may be $SP_{D(k)}=SP_{A(k-1)}+1$. As illustrated in FIG. 5, non-artery nodes i and j are connected by artery node A1. Applying the hypothesis to the present example, $SP_{j(2)}=SP_{A1(1)}+1$ or 2=1+1, which is true. Assuming the hypothesis holds for all destinations of k hops, then the following hypothesis is true: $SP_{D(K+1)}=SP_{A(k+1-1)}+1=SP_{A(k)}+1$. An artery node is a valid destination node. Thus, $SP_{A(k)}$ may be substituted in the following equation: $SP_{D(K+1)}=SP_{A(k)}+1=SP_{A(k-)}+1+1=SP_{A(k-)}+2$. FIG. 6 illustrates the resulting equation. Node I represents all nodes that are a common one hop neighbor to node A and D. The destination D is two hops away from the Artery node A that is (k−1) hops from the source node S. The destination node D is not connected to A because it is two hops away, and nodes A and D make up a two hop node pair. Applying the aforementioned lemma, a node exists in the set of nodes I that is an artery node. Therefore, $SP_{D(K+1)}=SP_{A(k+1-1)}+1$ is true demonstrating that the shortest path between any two nodes in an artery network is along a contiguous path of artery nodes. Thus, for k=2 (applying the equation $SP_{D(3)}=SP_{A(2)}+1$) the shortest path between any two nodes that are three hops apart includes a path to an artery node that is two hops away plus one more hop. Thus, applying the lemma for $SP_{A(2)}$ includes two artery nodes.

It is contemplated that the present method and system may be implemented in a variety of communication networks including a mobile ad-hoc network (MANET). For example, the method may be included within a Cluster 1 joint tactical radio system (JTRS), a Cluster 5 JTRS, and an airborne maritime and fixed-station (AMF) JTRS.

It is to be noted that the foregoing described embodiments according to the present invention may be conveniently implemented using conventional general purpose digital computers programmed according to the teachings of the present specification, as may be apparent to those skilled in the computer art. Appropriate software coding may readily be prepared by skilled programmers based on the teachings of the present disclosure, as may be apparent to those skilled in the software art.

It is to be understood that the present invention may be conveniently implemented in the form of a software package. Such a software package may be a computer program product which employs a computer-readable medium including stored computer code used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for propagating network node topology data in a wireless network, the method comprising:
   electing a set of artery nodes to operate as multi-point relay (MPR) nodes using an algorithm, wherein a node, X, is an artery node when it is the midpoint of the shortest hop path between nodes Y and Z, said nodes Y and Z are not neighbors of each other and for which X is their only common neighbor node;
   transmitting distance vector routing information from each of the set of all artery and non-artery nodes to each node's respective one hop neighbor nodes;
   receiving said distance vector routing information by the one hop neighbor nodes of each of said set of all artery and non-artery nodes;
   updating a distance vector routing table defined within each of said set of all artery and non-artery nodes with received distance vector routing information; and
   transmitting updated distance vector routing information from only the artery nodes to each of the respective one hop neighbor nodes of the artery nodes in order to propagate distance vector routing information throughout the wireless network.

2. The method of claim 1, wherein said respective one hop neighbor nodes include artery nodes and non-artery nodes.

3. The method of claim 1, wherein the transmitting of distance vector routing information from the set of artery nodes to propagate distance vector routing information throughout the wireless network includes information received by each neighboring network node that is one hop away from each of the artery nodes included within the set of artery nodes.

4. The method of claim 1, wherein the wireless network is a mobile ad-hoc network (MANET).

5. The method of claim 1, wherein the method is implemented in a radio system.

6. The method of claim 5, wherein the radio system is a Cluster 1 Joint Tactical Radio System (JTRS), a Cluster 5 JTRS, or an airborne maritime and fixed-station (AMF) JTRS.

7. A system for propagating network node topology data in a wireless network, the system comprising:
   a memory;
   a processor configured for being communicatively coupled to the memory, the processor being configured to execute an algorithm to elect a plurality of artery nodes such that a node, X, is an artery node when it is the midpoint of the shortest hop path between nodes Y and Z, said nodes Y and Z are not neighbors of each other and for which X is their only common neighbor node;
   the plurality of artery nodes operating as multi-point relay (MPR) nodes to propagate distance vector routing information throughout the wireless network; and
   a plurality of non-artery nodes communicatively coupled to the plurality of artery nodes, each non-artery node being located one hop from at least one artery node included in the plurality of artery nodes;
   wherein the plurality of artery nodes and the plurality of non-artery nodes each transmit distance vector routing information to their respective one hop neighbor nodes, which subsequently modify a routing table defined within each one hop neighbor node, and updated distance vector routing information based upon the routing table modifications is transmitted only from the plurality of artery nodes to each respective one hop neighbor node of the plurality of artery nodes in order to propagate distance vector routing information throughout the wireless network.

8. The system of claim 7, wherein the wireless network is a mobile ad-hoc network (MANET).

9. The system of claim 7, wherein the system is implemented in a radio system.

10. The system of claim 9, wherein the radio system is a Cluster 1 Joint Tactical Radio System (JTRS), a Cluster 5 JTRS, or an airborne maritime and fixed-station (AMF) JTRS.

11. A non-transitory computer-readable medium having computer-executable instructions for performing a method for propagating network node topology data in a wireless network, the method comprising:

elkilling a set of artery nodes to operate as multi-point relay (MPR) nodes using an algorithm, wherein a node, X, is an artery node when it is the midpoint of the shortest hop path between nodes Y and Z, said nodes Y and Z are not neighbors of each other and for which X is their only common neighbor node;

transmitting distance vector routing information from each of the set of all artery and non-artery nodes to each node's respective one hop neighbor nodes;

receiving said distance vector routing information by the one hop neighbor nodes of each of said set of all artery and non-artery nodes;

updating a distance vector routing table defined within each of said set of all artery and non-artery nodes with received distance vector routing information; and transmitting updated distance vector routing information from only the artery nodes to each of the respective one hop neighbor nodes of the artery nodes in order to propagate distance vector routing information throughout the wireless network.

12. The non-transitory computer-readable medium of claim 11, wherein said respective one hop neighbor nodes include artery nodes and non-artery nodes.

13. The non-transitory computer-readable medium of claim 11, wherein the wireless network is a mobile ad-hoc network (MANET).

\* \* \* \* \*